United States Patent [19]

Kurata

[11] Patent Number: 5,414,787
[45] Date of Patent: May 9, 1995

[54] COUPLING STRUCTURE BETWEEN OPTICAL SEMICONDUCTOR AND OPTICAL WAVEGUIDE, AND COUPLING METHOD OF THE SAME

[75] Inventor: Kazuhiko Kurata, Tokyo, Japan
[73] Assignee: NEC Corporation, Tokyo, Japan
[21] Appl. No.: 280,609
[22] Filed: Jul. 26, 1994

[30] Foreign Application Priority Data

Jul. 27, 1993 [JP] Japan .................. 5-184880

[51] Int. Cl.⁶ .................. G02B 6/00; G02B 6/36
[52] U.S. Cl. .................. 385/92; 385/88
[58] Field of Search .......... 385/88, 92, 89, 53, 385/69

[56] References Cited

U.S. PATENT DOCUMENTS

| | | | |
|---|---|---|---|
| 4,466,696 | 8/1984 | Carney | 385/49 |
| 4,639,074 | 1/1987 | Murphy | 350/96.15 |
| 4,788,406 | 11/1988 | Holman et al. | 385/99 |
| 4,892,374 | 1/1990 | Ackerman et al. | 385/49 |
| 4,904,036 | 2/1990 | Blonder | 385/49 |
| 4,930,854 | 6/1990 | Albares et al. | 385/49 |
| 5,277,930 | 1/1994 | Uchida | 427/162 |
| 5,299,276 | 3/1994 | Okamura et al. | 385/130 |

FOREIGN PATENT DOCUMENTS

| | | |
|---|---|---|
| 0318267 | 5/1989 | European Pat. Off. . |
| 0331334 | 9/1989 | European Pat. Off. . |
| 0514731 | 11/1992 | European Pat. Off. . |
| 4013630 | 12/1990 | Germany . |
| 61-87113 | 5/1986 | Japan . |
| 93/11453 | 6/1993 | WIPO . |

OTHER PUBLICATIONS

Cohen, Mitchell S. et al., "Packaging of High-Density Fiber/Laser Modules Using Passive Alignment Techniques", *IEEE Transactions on Components, Hybrids, and Manufacturing Technology*, vol. 15, No. 6, Dec., 1992, New York, U.S., pp. 944-954.

"Optical Module with a Silica-Based Planar Lightwave Circuit for fiber-Optic Subscriber Systems" by H. Terui, et al. IEEE Photonics Technology Letters, vol. 4, No. 6, pp. 660-662, Jun. 1992.

"A compact Multichannel Transceiver Module Using Planar-Processed Optical Waveguides and Flip-Chip Optoelectronic Coponents" by K. P. Jackson et al. IEEE 0569-5503/92/0000-0093 (1992 pp. 93-114).

*Primary Examiner*—Akm E. Ullah
*Attorney, Agent, or Firm*—Sughrue, Mion, Zinn, Macpeak & Seas

[57] ABSTRACT

A structure and a method for coupling an optical semiconductor and an optical waveguide with high accuracy and productivity is disclosed. The semiconductor is mounted on a first substrate which is formed with a groove. A short optical fiber is received in the groove such that it is positioned at the same height as the light emitting portion of the semiconductor. The waveguide is formed on a second substrate while a groove is formed in the second substrate on the imaginary extension of the waveguide. The upper half of the short fiber is received in the groove of the second substrate, so that the fiber and waveguide are coupled to each other. To position the semiconductor relative to the first substrate, marks are provided on the mounting surface of the semiconductor and the surface of the first substrate and implemented by thin films which are opaque for infrared rays. The position of the semiconductor is adjusted by the steps of radiating infrared rays, calculating the areal centers of gravity of the marks, and moving the semiconductor until the areal centers of gravity align with each other.

12 Claims, 4 Drawing Sheets

INFRARED RAYS

FIG.8
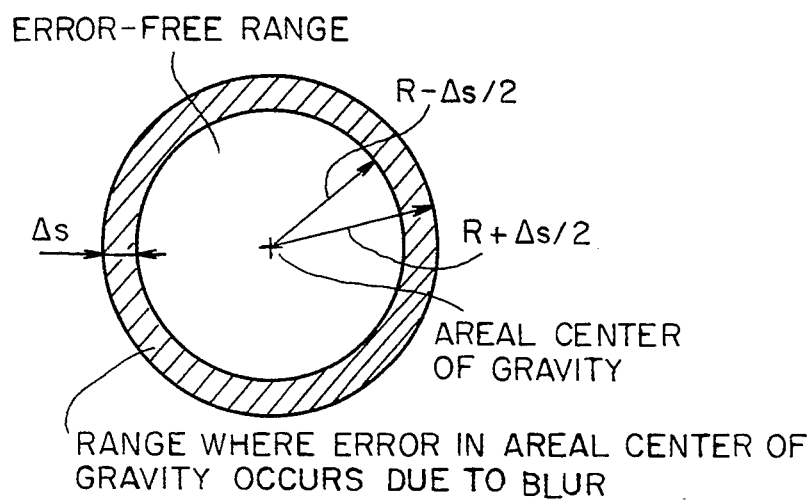
ERROR-FREE RANGE
R−Δs/2
R+Δs/2
Δs
AREAL CENTER OF GRAVITY
RANGE WHERE ERROR IN AREAL CENTER OF GRAVITY OCCURS DUE TO BLUR
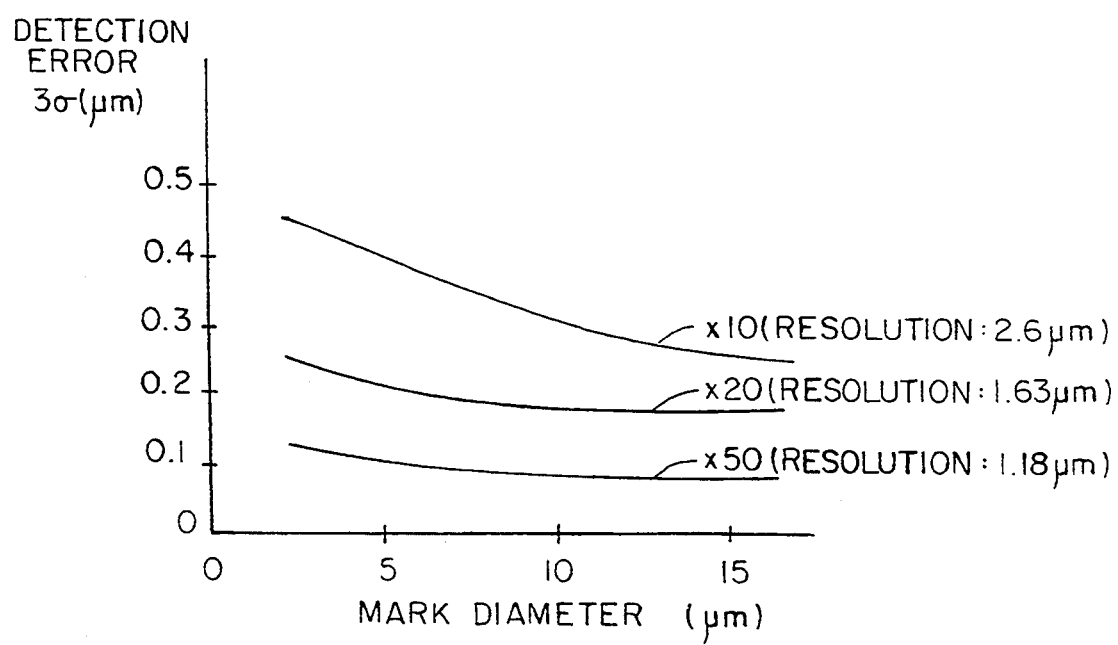
FIG.9

COUPLING STRUCTURE BETWEEN OPTICAL SEMICONDUCTOR AND OPTICAL WAVEGUIDE, AND COUPLING METHOD OF THE SAME

BACKGROUND OF THE INVENTION

The present invention relates to an optical waveguide type device having an optical semiconductor and an optical waveguide and, more particularly, to a structure for coupling the semiconductor and waveguide, and a coupling method of the same.

Optical waveguide type devices, like electronic devices, can be produced on a quantity basis and can be provided with advanced functions and a highly integrated configuration. To further enhance the functions and integration, there is available a coupling structure having an optical semiconductor in a waveguide type device and connects the semiconductor directly to an optical waveguide.

It has been customary with the structure optically coupling the optical semiconductor to the optical waveguide to cause the semiconductor to emit light by flowing a current therethrough, and monitor light coming out of the waveguide so as to adjust the position of the semiconductor. A coupling structure capable of coupling an optical semiconductor to an optical waveguide without any positional adjustment is disclosed in, for example. Japanese Patent Laid-Open Publication No. 61-87113. In this kind of coupling structure, a guide is formed on an optical waveguide substrate beforehand, and an optical member and optical semiconductor are fitted in the guide.

To couple an optical semiconductor to an optical waveguide via a lens with efficiency, it is necessary that the semiconductor and lens be each positioned with accuracy less than about 1 μm relative to the waveguide. The conventional coupling structure mentioned above positions the semiconductor and lens by the guide without adjustment, so that the guide has to be provided with an extremely accurate configuration. However, this is extremely difficult since the guide suffers from errors when formed by patterning or etching. Another problem is that a step of forming the guide is needed in addition to a step of forming the waveguide, complicating the entire process and, therefore, limiting productivity. In addition, since the guide is located in the vicinity of the end of the waveguide, it is impossible to measure, before mounting the semiconductor, the loss and other characteristics of the waveguide by abutting an optical fiber against the end of the waveguide.

SUMMARY OF THE INVENTION

It is, therefore, an object of the present invention to couple an optical semiconductor to an optical waveguide accurately with high productivity without causing it to emit light.

It is another object of the present invention to provide a coupling structure between an optical semiconductor and an optical waveguide which allows an optical fiber to be abutted against the end of the waveguide for measurement, and a coupling method of the same.

In accordance with the present invention, a coupling structure between an optical semiconductor and an optical waveguide has the semiconductor mounted on the surface of an auxiliary substrate. A short optical fiber is received in a groove formed in the auxiliary substrate and is positioned such that the core of the fiber is located at the same height, as measured from the surface of the auxiliary substrate, as a light emitting portion included in the semiconductor. The waveguide is formed on an optical waveguide substrate and has a terminating end portion on the surface of the optical waveguide substrate; the terminating end has a mirror-finished end. The optical waveguide substrate has a groove in the surface thereof on the imaginary extension of the core of the waveguide. Part of the short optical fiber rising above the surface of the auxiliary substrate is received in the groove of the optical waveguide substrate. The height of the core of the optical fiber is the same as the height of the core of the waveguide, so that the semiconductor and waveguide are coupled to each other.

Also, in accordance with the present invention, a coupling structure between an optical semiconductor and an optical waveguide has the semiconductor and waveguide mounted to an auxiliary substrate beforehand in an optically coupled relation. A short optical fiber is received in a groove formed in the auxiliary substrate such that part of the fiber slightly smaller than one half of the diameter is positioned below the surface of the substrate. In this configuration, the core of the fiber and the light emitting portion of the semiconductor are located at the same height as measured from the surface of the auxiliary substrate. The waveguide is formed on an optical waveguide substrate. The optical waveguide substrate is also formed with a groove on the imaginary extension of the terminating end of the waveguide. The auxiliary substrate is put on the optical waveguide substrate such that part of the short optical fiber protruding from the surface of the auxiliary substrate is received in the groove of the optical waveguide substrate. As a result, the short fiber and waveguide are coupled to each other.

With any of the above structures, it is not necessary to form a highly accurate guide on the optical waveguide substrate, so that the process is simple. Positional adjustment for optically coupling the short fiber and waveguide is needless since they are positioned by the grooves formed in the substrates. If the substrates are each implemented by silicon, V-shaped grooves can be formed in their surfaces by anisotropic etching easily and highly accurately. Before the terminating end and grooves are formed for mounting the auxiliary substrate to the optical waveguide substrate, an optical fiber can be directly abutted against the end of the waveguide from the outside, facilitating the measurement of the characteristics of the waveguide.

Further, in accordance with the present invention, a coupling structure between an optical semiconductor and an optical waveguide has a thin film opaque for infrared rays and formed in part of the surface of an optical semiconductor which contacts an auxiliary substrate. Another thin film also opaque for infrared rays is formed in the entire or part of a region of the surface of the auxiliary substrate other than the region which faces the thin film of the semiconductor. Two figures are respectively formed by contours defined by the boundaries of the two thin films being coincident in position. By the radiation of infrared rays, the two figures are detected in order to position the semiconductor relative to the auxiliary substrate.

The relative position of the auxiliary substrate and semiconductor is detected on the basis of the thin films respectively formed on the substrate and semiconductor, as stated above. This implements coupling without causing the semiconductor to emit light. In addition, a guide or similar extra member for positioning is not necessary. The thin films can be formed and the figures can be patterned easily by the chemical vacuum deposition of a metal film and photolithography. Moreover, the figures can be formed extremely accurately since etching as deep as with the guide of the conventional coupling structure is not necessary. When the thin films are implemented by metal films or similar materials opaque for infrared rays, it is possible to detect the figures of the thin films by radiating infrared rays from above the semiconductor or from below the auxiliary substrate. This can be done since the auxiliary substrate is made of silicon which is transparent for infrared rays. Further, even InGaAs, InP or similar compound customary with optical semiconductors is transparent for infrared rays, so that the figures can be detected even when infrared rays are radiated from above the semiconductor.

In the coupling structure of the present invention, the figures based on the thin films are provided at least in a single pair on the surface of the auxiliary substrate and the mounting surface of the semiconductor. The centers of gravity of the respective figures are detected and brought into alignment in order to position the semiconductor. When the figures formed by the thin films are simply detected on the basis of their contours, the positioning accuracy is sometimes slightly lowered due to, for example, the chip-off of the contours of the figures which may occur during patterning or etching. In light of this, the present invention calculates the areal centers of gravity of the figures and brings them into alignment, thereby enhancing accurate positioning.

BRIEF DESCRIPTION OF THE DRAWINGS

The above and other objects, features and advantages of the present invention will become more apparent from the following detailed description taken with the accompanying drawings in which:

FIG. 8 is indicative of the areal center of gravity of a circular mark; and

FIG. 9 is a graph indicative of a relation between the diameter of a mark and the error in the detection of the areal center of gravity with respect to some different magnifications of a microscope.

DETAILED DESCRIPTION OF THE PREFERRED EMBODIMENTS

Figure 1:
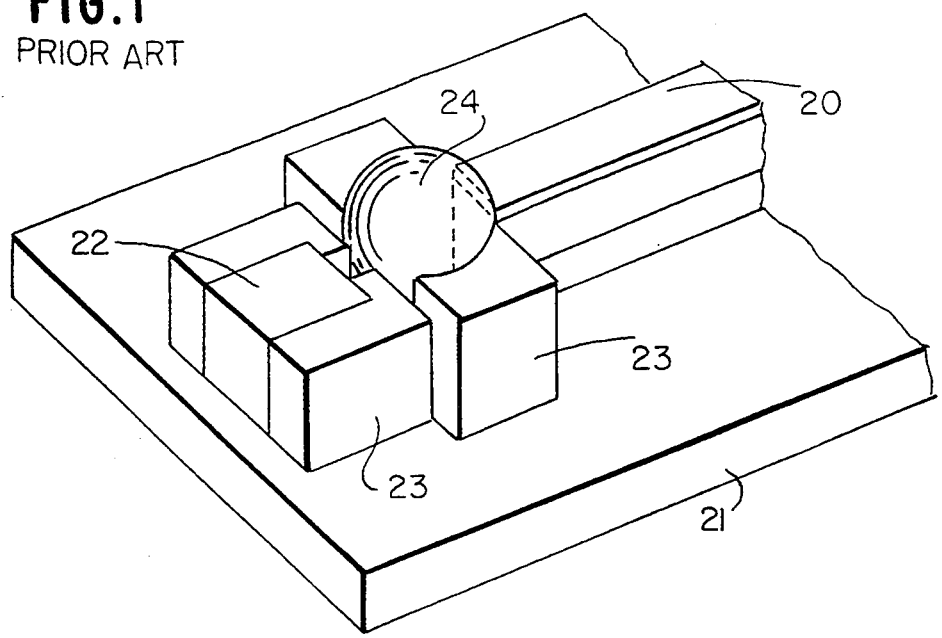
FIG. 1 is a perspective view of a conventional coupling structure between an optical semiconductor and an optical waveguide.

To better understand the present invention, a brief reference will be made to conventional coupling structures between an semiconductor and an optical waveguide. To optically couple an optical semiconductor to an optical waveguide, it has been customary to flow a current through the semiconductor so as to cause it to emit light. The resulting light output from the waveguide is monitored for adjusting the position of the semiconductor. FIG. 1 shows another conventional coupling structure which is practicable without resorting to such repositioning. As shown, the coupling structure includes a guide 23 provided on a substrate 21 for locating a lens 24 and an optical semiconductor 22 at accurate positions relative to an optical waveguide 20. The guide 23 facilitates the positioning of the lens 24 and semiconductor 22, thereby promoting easy assembly.

The first-mentioned conventional structure has to feed a current through the semiconductor in order to cause it to emit light. This brings about a problem that the positional adjustment consumes a substantial period of time, limiting productivity. On the other hand, the prerequisite with the structure shown in FIG. 1 is that a guide groove for positioning be formed with high accuracy, although a current does not have to be led through the semiconductor. In addition, when the semiconductor 22 and lens 24 are mounted to the guide groove, they are apt to damage the guide groove.

Figure 2:
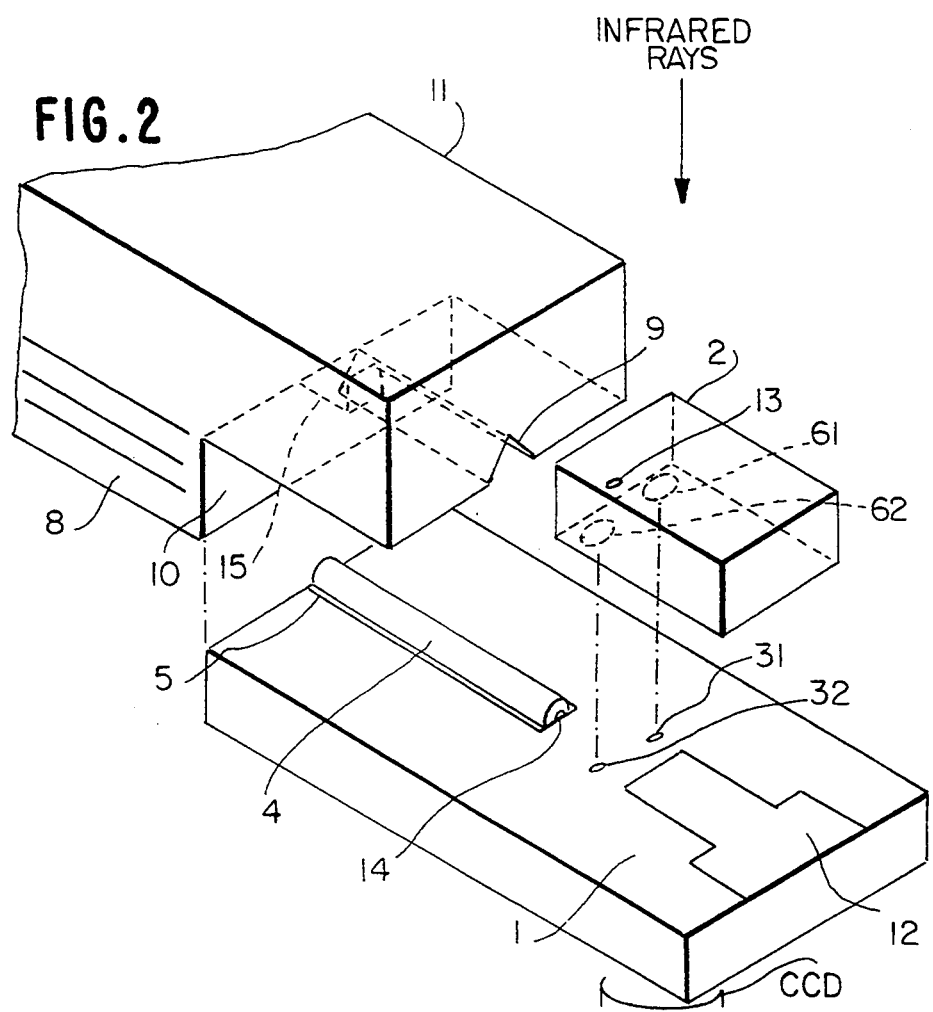
FIG. 2 is an exploded perspective view showing a coupling structure embodying the present invention.

Referring to FIG. 2, a coupling structure embodying the present invention is shown which positions an optical semiconductor accurately on a substrate without causing it to emit light or resorting to an accurate guide. As shown, an optical semiconductor 2 is mounted on the surface of an auxiliary substrate 1 with a junction thereof facing the surface of the substrate 1. In the illustrative embodiment, the semiconductor 2 is implemented as a 1.31 $\mu$m optical semiconductor laser diode made of an InGaAsP-based quaternary compound by way of example. The chip size is about 300 $\mu$m square. Made of silicon, the auxiliary substrate 11 is provided with two circular marks 31 and 32 on the surface thereof. The marks 31 and 32 are comprised of thin films of metal and used to detect a position where the semiconductor 2 should be mounted. Specifically, by detecting the marks 31 and 32, it is possible to detect, when the semiconductor 2 is mounted to the substrate 1, the position where the semiconductor 2 is coupled to a short optical fiber 4. The reference numeral 12 designates a padding playing the role of an electrode.

The marks 31 and 32 are implemented by CrPtAn films and spaced 200 $\mu$m apart from each other in the right-and-left direction. The marks 31 and 32 each has a diameter of 30 $\mu$m. Circular marks 61 and 61, which are slightly larger than the marks 31 and 32, are formed on the surface of the semiconductor 2 which is to contact the auxiliary substrate 1. The marks 61 and 62, like the marks 31 and 32, are implemented by CrPtAn films, and each has a diameter of 10 $\mu$m. The distance between the marks 61 and 62, as measured in the right-and-left direction, is 200 $\mu$m; a waveguide, not shown, inside the crystal of the semiconductor 2 is located at the center.

To position the semiconductor 2 relative to the auxiliary substrate 1, infrared rays are radiated from above the semiconductor 2, transmitted through the marks 31 and 32 and marks 61 and 62, and then detected at the back of the substrate 1. The detected light is subjected to image processing so as to calculate the areal centers of gravity of the marks. The position of the semiconductor 2 is finely adjusted such that the areal centers of gravity coincide with each other. Subsequently, the semiconductor 2 is mounted to the substrate 1. In such a coupling scheme based on the alignment of areal centers of gravity, the angle between the figures if they are provided in a single pair. For this reason, the embodiment uses two pairs of figures and couples the semiconductor 2 to the short optical fiber 4 such that the areal centers of gravity of each pair coincide with each other.

A generally V-shaped groove 5 is formed in the substrate 1 by anisotropic etching and at a position equally spaced from the marks 31 and 32. The short optical fiber 4 is received in the V-shaped groove 5. As for the anisotropic etching of silicon, it is a common practice to pattern, for example, a metallic coating by photolithography in a portion which should not be etched, and then immerse the assembly in an etching solution with the metallic pattern serving as a mask. In this embodiment, the mask and the marks 31 and 32 are implemented by the same thin film of metal, i.e., by a common process. This is advantageous not only in that the process is simplified, but also in that the relative positional accuracy of the groove 5 and marks 31 and 32 depends only on the accuracy of the mask for photolithography. As a result, extremely high positional accuracy is maintained.

The groove 5 and the optical fiber 4 received therein have the same length. The open portion of the groove 5 has a width and a depth selected such that the fiber 4, received in the groove 5, has a core 14 thereof located at the same height, as measured from the surface of the substrate 1, as a light emitting portion 13 included in the semiconductor 2. The positions of the marks 31 and 32 and the position of the centerline of the groove 5 are patterned beforehand such that when the semiconductor 2 is mounted to the substrate 1, the optical axis thereof is aligned with that of the fiber 4.

An optical waveguide substrate 11, like the auxiliary substrate 1, is made of silicon and formed with a waveguide 8 on the surface thereof. The waveguide 11 has a mirror-finished end 10 on the surface of the substrate 11. A generally V-shaped groove 9 is formed by anisotropic etching on the imaginary extension of a core 15 included in the waveguide 8. The open portion of the groove 9, like that of the groove 5, has a width and a depth selected such that when the fiber 4 is received in the groove 9, the core 14 of the fiber 4 is positioned at the same height, as measured from the surface of the substrate 11, as the waveguide 8. The substrate 11 is positioned such that the surface thereof having the waveguide 8 faces the surface of the auxiliary substrate 1. The substrates 1 and 11 are affixed to each other with the fiber 4 received in the groove 9. As a result, the semiconductor 2 and waveguide 8 are optically coupled to each other via the fiber 4 without any positional adjustment.

In the illustrative embodiment, when the semiconductor 2 is mounted to the auxiliary substrate 1, the light emitting portion 13 thereof is positioned at a height of 5 $\mu$m. To position the core 14 of the fiber 4 at the same height as the light emitting portion 13, the open portion of the V-shaped groove 5 is dimensioned 142 $\mu$m wide and 80 $\mu$m deep. The groove 5 and fiber 4 each has a length of 5 mm in order to insure stable positioning of the substrates 1 and 11 relative to each other. After the fiber 4 has been received in the groove 5, it is fixed in place by a thermosetting epoxy-based adhesive to complete the assembly of the auxiliary substrate 1. It is to be noted that before the assembly, several optical fibers are cut together by a blade saw while having their ends mirror-finished.

How the semiconductor 2 is adjusted in position and mounted to the auxiliary substrate 1 will be described specifically. To begin with, the semiconductor 2 is transported to above the substrate 1 by a vacuum sucker until the marks 31 and 32 substantially align with the marks 61 and 62, respectively. Then, infrared rays are radiated from above the semiconductor 2. A CCD (Charge Coupled Device) is disposed below the substrate 1. As a result, the CCD senses two pairs of circles, one having a diameter of 10 $\mu$m and the other having a diameter of 30 $\mu$m, due to the light transmitted through the semiconductor 2 and substrate 1 and the shadows attributable to the marks 61, 62, 31 and 32. In the initial stage of positioning, the larger circles and the smaller circles are slightly deviated from each other. After such circles have been detected and subjected to image processing, the areal centers of gravity of the marks 31 and 32 and those of the marks 61 and 62 are calculated in terms of coordinates. As shown in FIG. 2, the semiconductor 2 is finely adjusted in position such that the areal centers of gravity of the marks 31 and 32 and those of the marks 61 and 62 align with each other. At this instant, the position of the semiconductor 2 is adjusted not only in the horizontal direction relative to the surface of the substrate 1, but also in the direction of rotation. After the fine adjustment, the relative position of the semiconductor 2 and substrate 1 is again determined by the above-stated procedure. If the areal centers of gravity of the larger circles and those of the smaller circles are aligned in coordinates, the semiconductor 2 is soldered to the substrate 1. While infrared rays have been shown and described as being radiated from above the silicon substrate 11, they may be radiated from below the substrate 11 since the substrate 11 is transparent for such rays.

To form the waveguide 8 on the silicon substrate 11, a silicon dioxide (SiO$_2$) film is formed on the substrate 11 by CVD (Chemical Vacuum Deposition). The portion of the waveguide 8 to form a core 15 is doped with germanium so as to have a higher refractive index than the surrounding clad. The waveguide 8 provided on the substrate 11 is treated by ion beam etching such that the waveguide end 10 is formed 6 mm inboard of the end of the substrate 11. The surface of the substrate 11, exposed due to such ion beam etching, is formed with the V-shaped groove 9 on the imaginary extension of the waveguide 8 by the same method as with the auxiliary substrate 1. The axis of the waveguide core 15 is 15 $\mu$m high as measured from the surface of the substrate 11. The open portion of the groove 9 is 124 $\mu$m wide and 70 $\mu$m deep, so that the fiber core 14 is positioned at the same height as the waveguide core 15 when the fiber 4 is received in the groove 9.

Figure 3:
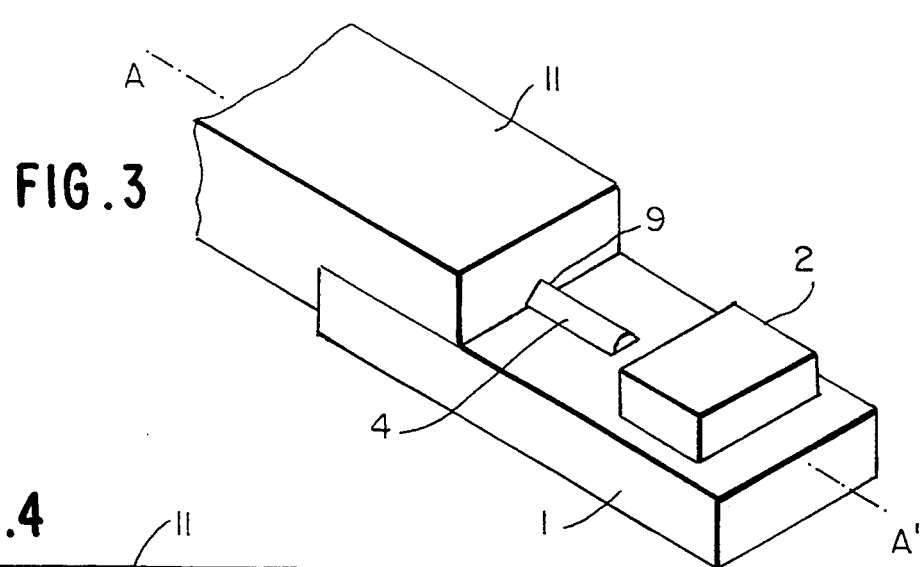
FIG. 3 is a perspective view of the embodiment in a coupled condition.
Figure 4:
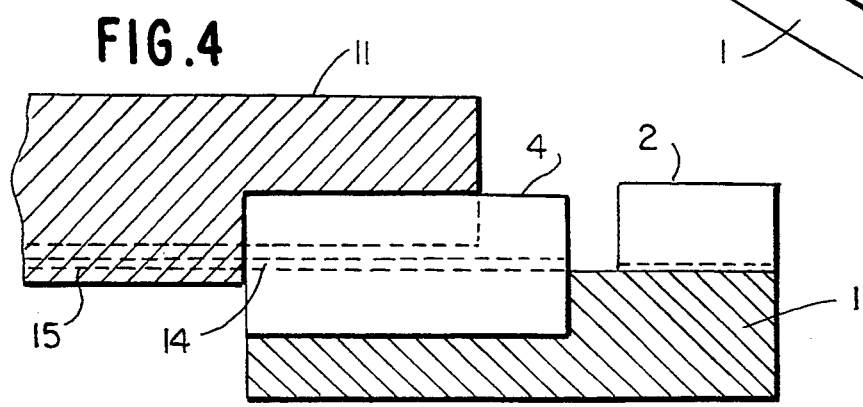
FIG. 4 is a section along line A—A' of FIG. 3.

After the assembly of the auxiliary substrate 1 and the formation of the groove 9 in the waveguide substrate 11, the substrate 1 is mounted to the substrate 11. Specifically, the surface of the substrate 1 is positioned to face the surface of the substrate 11, and then the portion of the fiber 4 protruding from the substrate 1 is received in the groove 9. In this position, the substrates 1 and 11 are affixed to each other by a thermosetting epoxy resin. This part of the procedure does not need any adjustment since the fiber 4 serves to position the substrates 1 and 11 relative to each other. To reduce Fresnel reflections, the end of the fiber 4 and that of the waveguide 8 are matched in refractive index by a resin. FIGS. 3 and 4 show the resulting coupling structure in a perspective view and a vertical section, respectively. After the assembly, an optical fiber, not shown, is affixed to the end of the waveguide opposite to the end where the auxiliary substrate 1 is positioned. Finally, the entire assembly, including the optical fiber is accommodated in a casing, not shown, to complete the device.

The device was evaluated as to the optical output characteristic of the optical fiber. The optical output characteristic was found comparable with a characteristic achievable with the conventional system wherein an optical semiconductor was caused to emit light for optical positioning. Experiments showed that the coupling efficiency derived from the optical output characteristic is only about 0.5 dB lower than the coupling efficiency particular to the above-mentioned conventional system. Presumably, therefore, the total positional deviation between the semiconductor 2 and the fiber 4, between the fiber 4 and the waveguide 8, and between the waveguide 8 and the optical fiber, not shown, is far smaller than 1 μm.

As stated above, the coupling between the semiconductor 2 and the fiber 4 and the coupling between the fiber 4 and the waveguide 8 can be effected without any adjustment and, in addition, with high accuracy. Moreover, the detection of marks promotes easy and accurate coupling between the fiber 4 and the semiconductor 2, compared to the emission from an optical semiconductor.

Figure 5:
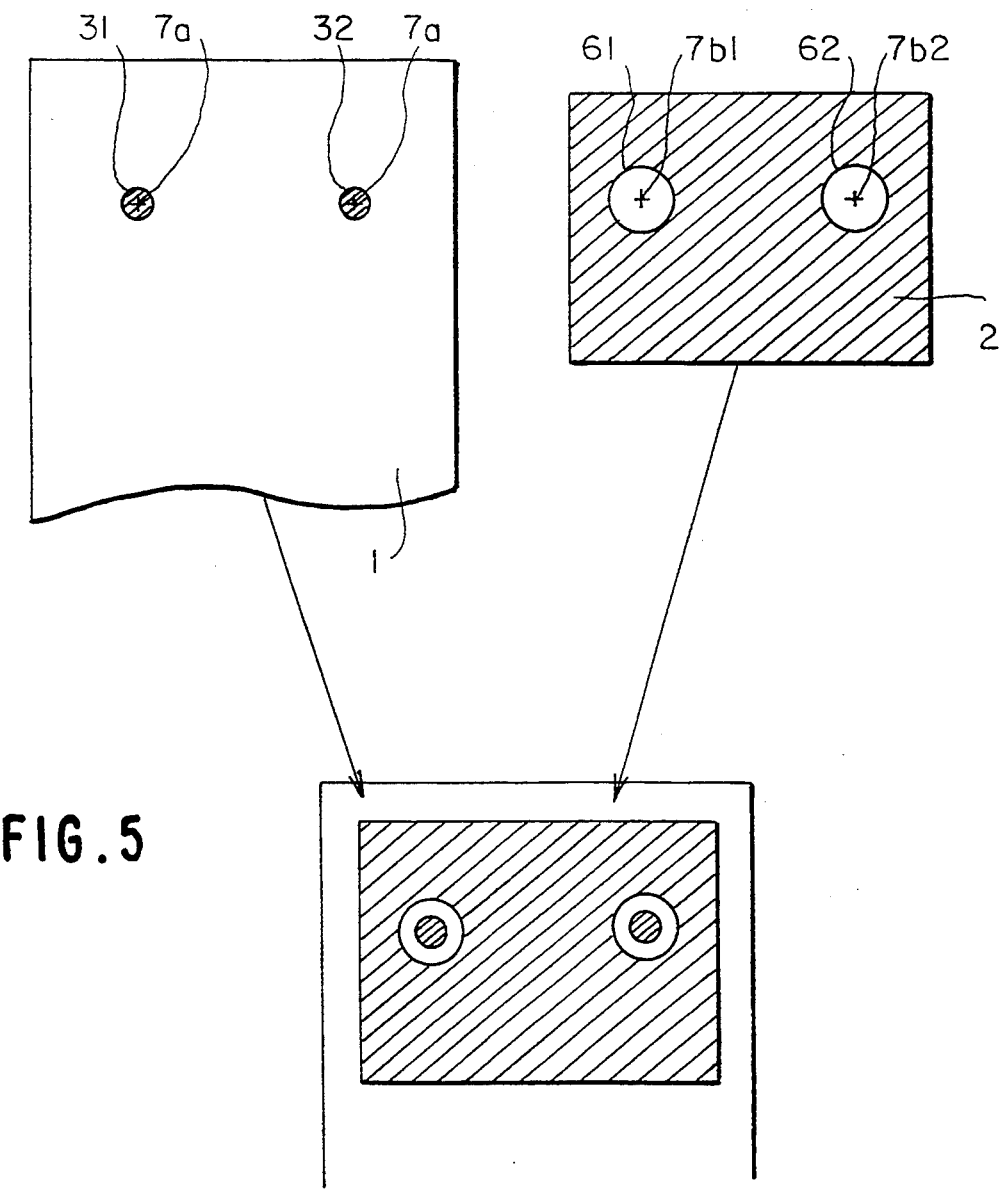
FIG. 5 shows specific positioning marks included in the embodiment.

A reference will be made to FIGS. 5-8 for describing the coupling method using the areal centers of gravity of the semiconductor and waveguide specifically. The position adjustment in accordance with the present invention and using marks stems from the fact that both the auxiliary substrate 1 and the semiconductor 2 transmit infrared rays. As shown in FIG. 5 specifically, the substrate 1 and semiconductor 2 are each provided with two circular marks which may be considered to be the marks 31 and 32 or 61 and 62, FIG. 2.

Regarding the marks, the larger circles and the smaller circles may respectively be replaced with larger crosses formed in the semiconductor 2 and smaller crosses formed in the auxiliary substrate 1. In such a case, the sides or the apexes of the respective crosses will be detected in terms of coordinates. Further, the contours of circles may be detected at several points in terms of coordinates. However, the position detecting method relying on the apexes or the contours of marks is lower in accuracy than the method of the embodiment which uses areal centers of gravity, for the reasons which will be described. With circular marks, therefore, the best result is achievable in respect of accuracy.

Specifically, the accuracy with which the position of a figure is detected greatly depends on the magnification and resolution of a microscope for condensing light reflected from or transmitted through a mark, and the resolution of a CCD or similar light-sensitive device. The problem with the apex or contour scheme stated above is that even if a high resolution CCD is used, positional accuracy of detection higher than the accuracy of optics of a microscope is, in principle, not attainable. For example, when the contour of a mark should be detected, light reflected from or transmitted through the mark is condensed by a microscope and then input to a light-sensitive device. Subsequently, the light has the tonality levels thereof binarized into black or white with respect to a preselected level. The resulting boundary values are recognized as a contour.

Figure 6:
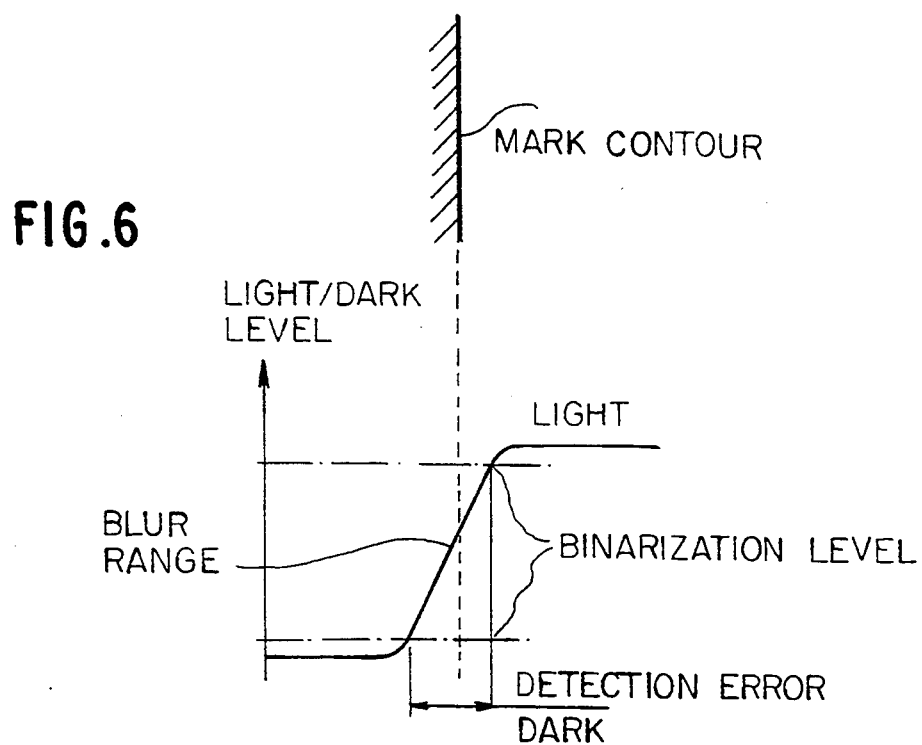
FIG. 6 is representative of a relation between the neighborhood of the contour of a mark and the tonality level of detected light.

In practice, however, light incident to a CCD from the neighborhood of a mark via a microscope is blurred in a range lower than the resolution of the object lens of the microscope. As a result, tonality changes little by little at the boundary, as shown in FIG. 6. At this instant, the position of the boundary changes depending on the level initially set for binarization. In addition, when it comes to optics using infrared rays, as in the present invention, resolution is aggravated since infrared rays have a longer wavelength than visible rays. For example, when use is made of an object lens of 20 magnifications, the error theoretically amounts to about 1.6 μm; when an object lens of 50 magnifications is used, the error amounts to about 1.2 μm.

Figure 7:
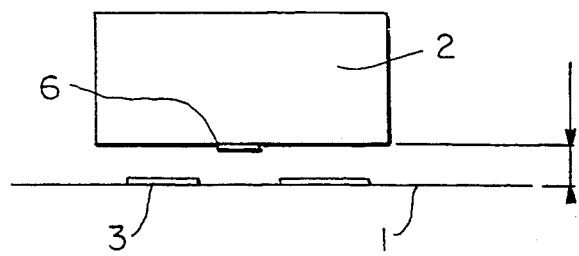
FIG. 7 is a section of an optical semiconductor and an auxiliary substrate included in the embodiment and being positioned relative to each other.

In principle, the resolution of optics will be increased if the magnification of an object lens is increased. However, a greater magnification directly translates into a smaller depth of a focus with the result the contour is apt to blur due to the displacement of the focus. As shown in FIG. 7, since the position of the semiconductor 2 has to be adjusted over the auxiliary substrate 1, it is necessary to space the semiconductor 2 at least several microns apart from the surface of the substrate 1. It follows that the distance between the microscope and the marks 31 and 32 and the distance between the microscope and the marks 61 and 62 are different from each other. To free the two pairs of marks from blurring, the magnification of the object lens should not exceed 20 magnifications. Consequently, an error of about 1.6 μm is not avoidable, as mentioned above.

The position detection using the apexes or the contour of a figure suffers not only from the errors attributable to the resolution of the optics, but also from errors attributable to the defects of a mark. Specifically, the accuracy noticeably falls when an apex or a contour is partly chipped off or rounded.

In accordance with the present invention, the coupling method using the areal center of gravity of a figure recognizes a mark as a plane. Hence, although the position of a contour may change for the above reasons when an image is binarized, even the portion inboard of the contour and not dependent on the resolution is input as information indicative of the position of the mark. This reduces the influence of the change in the position of a contour on the position of the areal center of gravity.

Assume that a circular mark is used, as in the embodiment, that the point where condensed light is detected has coordinates $r_{(x,y)}$, that a single pixel at the coordinates r has an area $\Delta S$, and the total area is S. Then, the center of gravity of the mark has coordinates $rG_{(x,y)}$ expressed as:

$$rG_{(x,y)} = (\Sigma r_{(x,y)} \Delta S)/S$$

FIG. 8 shows the shape and the center of gravity of a mark sensed by a CCD. The mark has a radius R while an object lens has a resolution $\Delta s$. In the region where the radius is substantially less than $R-(\Delta s/2)$, the areal center of gravity coincides with the center of the circular mark. By contrast, in the region ranging from $R-(\Delta s/2)$ to $R+(\Delta s/2)$ (indicated by hatching in the figure), there arises a problem that the actual shape differs from a true circle due to, for example, the different intensities of light and the binarization level, introducing errors in the detection of the position of the areal center of gravity.

FIG. 9 shows a relation between the radius of a circular mark and the error in position detection based on an areal center of gravity, as calculated with 10, 20 and 50 magnifications of the object lens of a microscope. For the calculation, the resolution of the CCD or similar light-sensitive device was assumed to be sufficiently smaller than that of the optics of the microscope. As shown, as the magnification of the microscope increases, the detection error decreases. Also, the error decreases with an increase in the radius of the mark since the ratio of the number of pixels lying in the circle to the number of pixels adjoining the boundary increases with an increase in the area of the mark. As the radius of the mark increases, not only the theoretical accuracy increases, but also the influence of chip-off and other defects of the contour of the thin film on the positional accuracy decreases.

Assuming that the microscope has 20 magnifications, it will be seen that a mark radius of 5 $\mu$m provides a position detection accuracy of about 0.2 $\mu$m. Specifically, with the coupling method of the present invention, it is possible to implement position detection accuracy which is about one-eighth of the resolution of the optics of a microscope. This also supports the desirable optical output characteristic previously described in relation to the embodiment. Of course, the coupling method of the present invention is practicable even with an oval, cross or similar shape other than a circle.

An alternative embodiment of the coupling structure in accordance with the present invention will be described hereinafter. In this embodiment, the end of the short fiber 4 which is to be coupled to the semiconductor 2 is cut flat by a blade saw. To further enhance the coupling efficiency, use may be made of an optical fiber having a convex tip. This kind of fiber may be produced by cutting a plurality of short fibers at the same time, and then immersing the tip of each fiber in an etching solution to thereby leave only the core thereof in a hemispherical shape. The allowable error in the relative position of the semiconductor and fiber should only be about 1 $\mu$m when the fiber has a flat end, but it should strictly be less than 0.5 $\mu$m when the fiber has a convex end. The coupling structure and method of the present invention withstand even such a strict condition.

It is not always necessary that the semiconductor 2 and fiber 4 be aligned with each other on the auxiliary substrate 1. For example, the fiber 4 may be cut obliquely beforehand, and the semiconductor 2 may be positioned obliquely relative to the fiber 4 in such a manner as to satisfy the Snell's law. This is successful in preventing reflections on the end of the fiber 4 from returning to the semiconductor 2.

In summary, it will be seen that the present invention provides a coupling structure which positions and couples an optical semiconductor to an optical waveguide easily and accurately. Since a guide for positioning is absent in the vicinity of the end of the waveguide, it is possible to evaluate the characteristic by abutting an optical fiber against the end of the waveguide from the outside before mounting the semiconductor. As a result, the coupling structure of the present invention is low cost and has high productivity and coupling efficiency.

What is claimed is:

1. A structure for optically coupling an optical semiconductor and an optical waveguide having a core which propagates light while confining said light, said structure comprising:
    said optical semiconductor mounted on a surface of a first substrate;
    a short optical fiber received in a groove formed in said first substrate and positioned such that a core of said short optical fiber is located at a same height, as measured from said surface of said first substrate, as a light emitting portion of said optical semiconductor; and
    said optical waveguide formed on a second substrate and having a terminating end portion on a surface of said second substrate, said terminating end having a mirror-finished end;
    said second substrate comprising a groove formed in said surface thereof on an imaginary extension of said core of said optical waveguide, part of said short optical fiber which rises above said surface of said first substrate being received in said groove of said second substrate;
    the height of said core of said short optical fiber being the same as a height of said core of said optical waveguide, whereby said optical semiconductor and said optical waveguide are coupled to each other.

2. A structure as claimed in claim 1, further comprising:
    a first thin film opaque for infrared rays and formed in part of a surface of said optical semiconductor which contacts said first substrate; and
    a second thin film opaque for infrared rays and formed in entire or part of a region of said surface of said first substrate other than a region which faces said first thin film;
    a first figure and a second figure respectively formed by contours defined by boundaries of said first and second thin films being coincident in position.

3. A structure as claimed in claim 2, wherein said optical semiconductor and said optical waveguide are optically coupled when areal centers of gravity of said first and second figures are coincident.

4. A structure as claimed in claim 3, wherein said first and second figures are provided in a plurality of pairs, said optical semiconductor and said optical waveguide being optically coupled when the areal centers of gravity of said first and second figures are coincident all of said in plurality of pairs.

5. A method of optically coupling an optical semiconductor and an optical waveguide having a core which propagates light while confining said light, said method comprising the steps of:
    disposing a short optical fiber in a groove formed in a first substrate such that a core of said short optical fiber is located at a same height, as measured from a surface of said first substrate, as a light emitting portion of said optical semiconductor mounted on said surface of said first substrate;
    disposing part of said short optical fiber rising above said surface of said first substrate in a groove formed in a second substrate on an imaginary extension of said core of said optical waveguide which is formed on a surface of a second substrate, said optical waveguide comprising a terminating end portion having a mirror-finished end: and
    coupling said optical semiconductor and said optical waveguide while positioning said core of said short optical fiber and said core of said optical waveguide at a same height.

6. A method as claimed in claim 5, further comprising the steps of:
    detecting a first figure formed by a contour defined by a boundary of a first thin film which is opaque for infrared rays and is formed in part of a surface of said optical semiconductor which contacts said first substrate, and a second figure formed by a contour defined by a boundary of a second thin film opaque for infrared rays and formed in entire or part of a region of said surface of said first substrate other than a region which faces said first thin film: and positioning and mounting said optical semiconductor to said first substrate.

7. A method as claimed in claim 6, further comprising the steps of:
   radiating infrared rays from above said optical semiconductor;
   detecting light reflected from said first and second thin films; and
   positioning and mounting said optical semiconductor to said first substrate.

8. A method as claimed in claim 6, further comprising the steps of:
   radiating infrared rays from above said optical semiconductor;
   detecting light transmitted through regions where said first and second thin films are absent; and
   positioning and mounting said optical semiconductor to said first substrate.

9. A method as claimed in claim 6, further comprising the steps of:
   radiating infrared rays from a surface of said first substrate opposite to said surface to which said optical semiconductor is mounted:
   detecting light reflected from said first and second thin films; and
   positioning and mounting said optical semiconductor to said first substrate.

10. A method as claimed in claim 6, further comprising the steps of:
    radiating infrared rays from a surface of said first substrate opposite to said surface to which said optical semiconductor is mounted;
    detecting light transmitted through regions where said first and second thin films are absent; and
    positioning and mounting said optical semiconductor to said first substrate.

11. A method as claimed in claim 6, further comprising the steps of:
    detecting said first and second thin films configured such that said optical semiconductor and said optical waveguide are coupled when said first and second figures have areal centers of gravity thereof aligning with each other;
    calculating the areal centers of gravity of said first and second figures;
    moving said optical semiconductor until the areal centers of gravity of said first and second figures align with each other; and
    affixing said optical semiconductor to said first substrate.

12. A method as claimed in claim 7, further comprising the steps of:
    detecting said first and second thin films configured such that said optical semiconductor and said optical waveguide are optically coupled when said first and second figures, provided in a plurality of pairs, have the areal centers of gravity thereof aligning in all of said plurality of pairs;
    calculating the areal centers of gravity of said first and second figures;
    moving said optical semiconductor until the areal centers of gravity of said first and second figures align with each other; and
    affixing said optical semiconductor to said first substrate.

* * * * *

UNITED STATES PATENT AND TRADEMARK OFFICE
CERTIFICATE OF CORRECTION

PATENT NO. : 5,414,787
DATED : May 9, 1995
INVENTOR(S) : Kazuhiko KURATA

It is certified that error(s) appears in the above-identified patent and that said Letters Patent is hereby corrected as shown below:

Col. 4, line 50, delete "61" (second occurrence), and insert --62--.

Signed and Sealed this

Twenty-third Day of April, 1996

Attest:

BRUCE LEHMAN

Attesting Officer

Commissioner of Patents and Trademarks